(12) United States Patent
Ljungblad et al.

(10) Patent No.: US 9,415,443 B2
(45) Date of Patent: Aug. 16, 2016

(54) METHOD AND APPARATUS FOR ADDITIVE MANUFACTURING

(71) Applicant: ARCAM AB, Moelndal (SE)

(72) Inventors: Ulric Ljungblad, Moelndal (SE); Anders Snis, Uddevalla (SE)

(73) Assignee: Arcam AB, Moelndal (SE)

( * ) Notice: Subject to any disclaimer, the term of this patent is extended or adjusted under 35 U.S.C. 154(b) by 352 days.

(21) Appl. No.: 14/244,503

(22) Filed: Apr. 3, 2014

(65) Prior Publication Data

US 2014/0348691 A1 Nov. 27, 2014

Related U.S. Application Data

(60) Provisional application No. 61/826,591, filed on May 23, 2013.

(51) Int. Cl.
*B22F 3/10* (2006.01)
*B22F 3/105* (2006.01)
*B29C 67/00* (2006.01)
(Continued)

(52) U.S. Cl.
CPC ............. *B22F 3/1055* (2013.01); *B22F 3/1017* (2013.01); *B29C 67/0077* (2013.01); *B33Y 10/00* (2014.12); *B33Y 30/00* (2014.12); *B22F 2003/1056* (2013.01); *Y02P 10/295* (2015.11)

(58) Field of Classification Search
CPC ........... B22F 2003/1056; B22F 3/1017; B22F 3/1055; B29C 67/0077; B33Y 10/00; B33Y 30/00; Y02P 10/295
USPC ...................... 419/53; 264/497; 425/78, 174.4
See application file for complete search history.

(56) References Cited

U.S. PATENT DOCUMENTS

| 3,882,477 A | 5/1975 | Mueller |
| 4,348,576 A | 9/1982 | Anderl et al. |

(Continued)

FOREIGN PATENT DOCUMENTS

| CN | 101607311 A | 12/2009 |
| CN | 101635210 A | 1/2010 |

(Continued)

OTHER PUBLICATIONS

International Search Report for PCT/EP2014/056489; mailed Sep. 19, 2014; 4 pages.*

(Continued)

*Primary Examiner* — Helene Klemanski
(74) *Attorney, Agent, or Firm* — Alston & Bird LLP

(57) ABSTRACT

A method for forming a three-dimensional article through successive fusion of parts of a powder bed, which parts corresponds to successive cross sections of the three-dimensional article, said method comprising the steps of: providing a model of said three dimensional article, providing a first powder layer on a work table, directing a first energy beam from a first energy beam source over said work table causing said first powder layer to fuse in first selected locations according to said model to form a first cross section of said three-dimensional article, directing a second energy beam from a second energy beam source over said work table causing said first powder layer to fuse in second selected locations according to said model to form the first cross section of said three-dimensional article, wherein said first and second locations of said first powder layer are at least partially overlapping each other.

5 Claims, 6 Drawing Sheets

(51) Int. Cl.
*B33Y 10/00* (2015.01)
*B33Y 30/00* (2015.01)

(56) References Cited

U.S. PATENT DOCUMENTS

| | | |
|---|---|---|
| 4,401,719 A | 8/1983 | Kobayashi et al. |
| 4,818,562 A | 4/1989 | Arcella et al. |
| 4,863,538 A | 9/1989 | Deckard |
| 4,927,992 A | 5/1990 | Whitlow et al. |
| 5,182,170 A | 1/1993 | Marcus et al. |
| 5,393,482 A | 2/1995 | Benda et al. |
| 5,483,036 A | 1/1996 | Giedt et al. |
| 5,640,667 A * | 6/1997 | Freitag ............... B22F 3/1055 419/55 |
| 5,647,931 A * | 7/1997 | Retallick ............. B29C 67/0077 425/174.4 |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,308,466 B2 | 11/2012 | Ackelid et al. |
| 8,992,816 B2 * | 3/2015 | Jonasson ............... B22F 3/1055 264/401 |
| 9,073,265 B2 * | 7/2015 | Snis ..................... B22F 3/1055 |
| 9,079,248 B2 | 7/2015 | Ackelid |
| 9,126,167 B2 * | 9/2015 | Ljungblad ............ B22F 3/1055 |
| 9,310,188 B2 | 4/2016 | Snis |
| 2002/0020164 A1 * | 2/2002 | Cleveland ............. B21C 37/06 60/39.01 |
| 2002/0104973 A1 | 8/2002 | Kerekes |
| 2003/0133822 A1 | 7/2003 | Harryson |
| 2004/0084814 A1 | 5/2004 | Boyd et al. |
| 2004/0104499 A1 | 6/2004 | Keller |
| 2004/0173496 A1 | 9/2004 | Srinivasan |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0175875 A1 | 8/2007 | Uckelmann et al. |
| 2007/0182289 A1 | 8/2007 | Kigawa et al. |
| 2007/0298182 A1 | 12/2007 | Perret et al. |
| 2009/0017219 A1 | 1/2009 | Paasche et al. |
| 2009/0152771 A1 | 6/2009 | Philippi et al. |
| 2010/0310404 A1 | 12/2010 | Ackelid |
| 2011/0133367 A1 | 6/2011 | Weidinger et al. |
| 2011/0309554 A1 | 12/2011 | Liska et al. |
| 2011/0316178 A1 | 12/2011 | Uckelmann |
| 2012/0100031 A1 * | 4/2012 | Ljungblad ............ B29C 67/0077 425/78 |
| 2012/0223059 A1 | 9/2012 | Ackelid |
| 2013/0270750 A1 * | 10/2013 | Green ................... B29C 67/0077 264/497 |
| 2013/0300286 A1 | 11/2013 | Ljungblad et al. |
| 2014/0271328 A1 * | 9/2014 | Burris .................. B22F 3/1055 419/53 |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0367367 A1 | 12/2014 | Wood et al. |
| 2014/0370323 A1 * | 12/2014 | Ackelid ................ B22F 3/1055 419/55 |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 * | 10/2015 | Ljungblad ............ B22F 3/1055 264/497 |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |

FOREIGN PATENT DOCUMENTS

| | | |
|---|---|---|
| CN | 101607311 B | 9/2011 |
| DE | 19952998 A1 | 5/2001 |
| DE | 20305843 U1 | 7/2003 |
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| DE | 102011105045 B3 | 6/2012 |
| EP | 0289116 A1 | 11/1988 |
| EP | 0322257 A2 | 6/1989 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| FR | 2980380 A1 | 3/2013 |
| JP | 2003245981 | 9/2003 |
| SE | 524467 C2 | 8/2004 |
| WO | WO 93/08928 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |

(56) References Cited

FOREIGN PATENT DOCUMENTS

| | | |
|---|---|---|
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

Written Opinion of the International Search Report for PCT/EP2014/056489; no mail date available; 6 pages.*

English translation of DE 102011105045; Jun. 2012; 11 pages.*

English translation of FR 2980380; Mar. 2013; 8 pages.*

International Preliminary Examining Authority, International Report on Patentability for International Application No. PCT/EP2014/056849, Sep. 1, 2015, 12 pages, European Patent Office, The Netherlands.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

International Searching Authority, International Search Report for International Application No. PCT/EP2012/057470, mailed Jan. 24, 2013, 1 page, European Patent Office, The Netherlands.

International Searching Authority, International Search Report for International Application No. PCT/EP2012/058733, mailed Mar. 5, 2013, 4 pages, European Patent Office, The Netherlands.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

Weigel, TH., et al., "Design And Preparation Of Polymeric Scaffolds For Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

* cited by examiner

METHOD AND APPARATUS FOR ADDITIVE MANUFACTURING

CROSS-REFERENCE TO RELATED APPLICATIONS

This application claims priority to and the benefit of U.S. Provisional Patent Application Ser. No. 61/826,591, filed May 23, 2013, the contents of which are hereby incorporated by reference in their entirety.

BACKGROUND

1. Technical Field

The present invention relates to a method and apparatus for additive manufacturing of three-dimensional articles.

2. Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which said three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

Thus, there is a demand for additive manufacturing techniques which are capable of building larger and larger three-dimensional articles. Increasing the build volume also requires higher beam power of the beam power source and/or higher deflection angles of the beam source which may lead to process difficulties in order to keep the beam spot quality equal over the entire build area.

BRIEF SUMMARY

An object of the invention is to provide methods and apparatuses which enable large build volumes of a three-dimensional articles produced by freeform fabrication or additive manufacturing without sacrificing the quality of the energy beam spot.

In a first aspect of the invention it is provided a method for forming a three-dimensional article through successive fusion of parts of a powder bed, which parts corresponds to successive cross sections of the three-dimensional article. Said method comprising the steps of: providing a model of said three dimensional article, providing a first powder layer on a work table, directing a first energy beam from a first energy beam source over said work table causing said first powder layer to fuse in first selected locations according to said model to form a first part of the first cross section of said three-dimensional article, directing a second energy beam from a second energy beam source over said work table causing said first powder layer to fuse in second selected locations according to said model to form a second part of the first cross section of said three-dimensional article, wherein said first and second locations of said first powder layer are at least partially overlapping each other in an overlapping zone.

An exemplary advantage of various embodiments of the present invention is that small deviation in beam gun alignment may not affect the overall quality of the three-dimensional article since the two beams are at least partially overlapping each other. Another advantage of the present invention may be that larger beam deflection angles may be used without sacrificing the beam spot size and beam shape.

In one example embodiment of the present invention said first and second locations of said first powder layer which are at least partially overlapping each other are simultaneously fused by said first and second energy beam from said first and second energy beam source respectively.

Another non-limiting advantage of this embodiment is that it is relatively time efficient since both beams are used at the same time.

In still another example embodiment of the present invention said first overlapping zone is simultaneously fused by said first and second energy beam from said first and second energy beam source respectively.

Still another non-limiting advantage of this embodiment is that the first and second beams are present simultaneously in the overlapping zone which may give some extra flexibility regarding heat transfer, dimension control and control of microstructure in the overlapping zone.

In still another example embodiment of the present invention a spot of said first energy beam is at least partially overlapping with a spot of said second energy beam during at least one occasion of said fusing of said at least partially overlapping first and second locations.

By allowing at least partially overlapping energy beams has the advantage that the melt strategy has no restrictions as would be the case if they are never allowed to overlap each other.

In another example embodiment said spot of said first energy beam and said spot of said second energy beam are at least partially overlapping with each other on said powder bed during a deflection of said first and second energy beams along a full length (L) of said overlapping zone.

An advantage of this example embodiment is that the microstructure may be controlled inside the overlapping zone and kept equal or at least very similar to the microstructure outside the overlapping zone. Another advantage is that the overlap from one beam to another may be prolonged and dependent on the width of the overlap zone which eliminates or at least reduces imperfections due to alterations in the beam spot position in the system.

In yet another example embodiment said first and second locations of said first powder layer which are at least partially overlapping each other are first fused by said first energy beam from said first energy beam source and after having finalized fusion by said first energy beam said second energy beam from said second energy beam source fuses the first and second locations which are at least partially overlapping each other.

This embodiment may be advantageous in cases when a re-melt of a specific area may reduce defects from powder imperfections. It may also be advantageous if one wants to change the microstructure in the overlap zone compared to the non-overlap zone.

In still another example embodiment of the present invention the sum of power of the first and second beam in said overlap is kept to a predetermined value which may vary or be constant over along the length (L) of the overlapping zone.

This embodiment has the advantage of making sure that the melting process inside and outside of the overlap zone is as similar as possible.

In still another example embodiment said constant value may be equal to the fusing power of the first and/or second beam outside said overlap.

In still another example embodiment the power of said first beam is varying linearly from 100% to 0% starting at a first end of said overlapping zone and ending at a second end of said overlapping zone, and simultaneously varying the power of said second beam linearly from 0% to 100% starting at the first end of said overlapping zone and ending at the second end of said overlapping zone.

The advantage of this embodiment is that the transition from one beam to another may be performed very smoothly.

Another exemplary embodiment may further comprise the steps of providing a second powder layer on top of said partially fused first powder layer, directing the first energy beam from the first energy beam source over said work table causing said second powder layer to fuse in a third selected locations according to said model to form a first part of a second cross section of said three-dimensional article, and directing the second energy beam from the second energy beam source over said work table causing said second powder layer to fuse in a fourth selected locations according to said model to form a second part of the second cross section of said three-dimensional article, said third and fourth selected locations of said second powder layer are at least partially overlapping each other, where the at least partially overlapping third and fourth locations are laterally shifted with respect to the at least partially overlapping first and second locations.

A non-limiting advantage of this embodiment is that any dissimilarity in the overlap zone with respect to the non-overlap zone is not directly enlarged since the overlap zone is shifted in position from one layer to another.

In still another example embodiment of the present invention the width of the overlapping region is equal in the first and second layer.

In still another example embodiment the laterally shifted distance of said third and fourth at least partially overlapping locations is chosen to a value resulting in a non-overlap of the third and fourth at least partially overlapping locations and the at least partially overlapping first and second locations.

An advantage of this embodiment is that any defect in the overlap region in a first layer is not present on top of any defects in an overlap zone in an adjacent layer.

In still another example embodiment the laterally shifted distance of said third and fourth at least partially overlapping locations is chosen to a value resulting in an overlap of the third and fourth at least partially overlapping locations and the at least partially overlapping first and second locations.

An exemplary advantage of this embodiment is that the overlap zone is affecting a restricted area of the three-dimensional part.

In still another example embodiment the first energy beam and the second energy beam may be laser beams or electron beams. In still another example embodiment the first energy beam may be a laser beam and the second energy beam may be an electron beam.

A non-limiting advantage of this embodiment is that different energy beam sources may be used to melt and/or heat the same area of a particular layer of the three-dimensional article. The laser may be more suitable for heating and the electron beam more suitable for melting for instance.

In still another example embodiment the laterally shifted distance of said third and fourth at least partially overlapping locations is randomized within a predetermined range.

An exemplary advantage of this embodiment is that any repeated defect may be eliminated due to the randomization.

In another aspect of the present invention it is provided a device for forming a three-dimensional article through successive fusion of parts of a powder bed, which parts corresponds to successive cross sections of the three-dimensional article, said apparatus comprising a computer model of said three-dimensional article, a first energy beam source providing a first energy beam over said work table causing said first powder layer to fuse in first selected locations according to said model to form a first part of a first cross section of said three-dimensional article, a second energy beam source providing a second energy beam over said work table causing said first powder layer to fuse in second selected locations according to said model to form a second part of a first cross section of said three-dimensional article, a control unit for controlling an overlap of said first selected location and said second selected locations and a power of said first and second energy beam in said overlap.

With such an apparatus large articles with controlled quality may be produced.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 3:
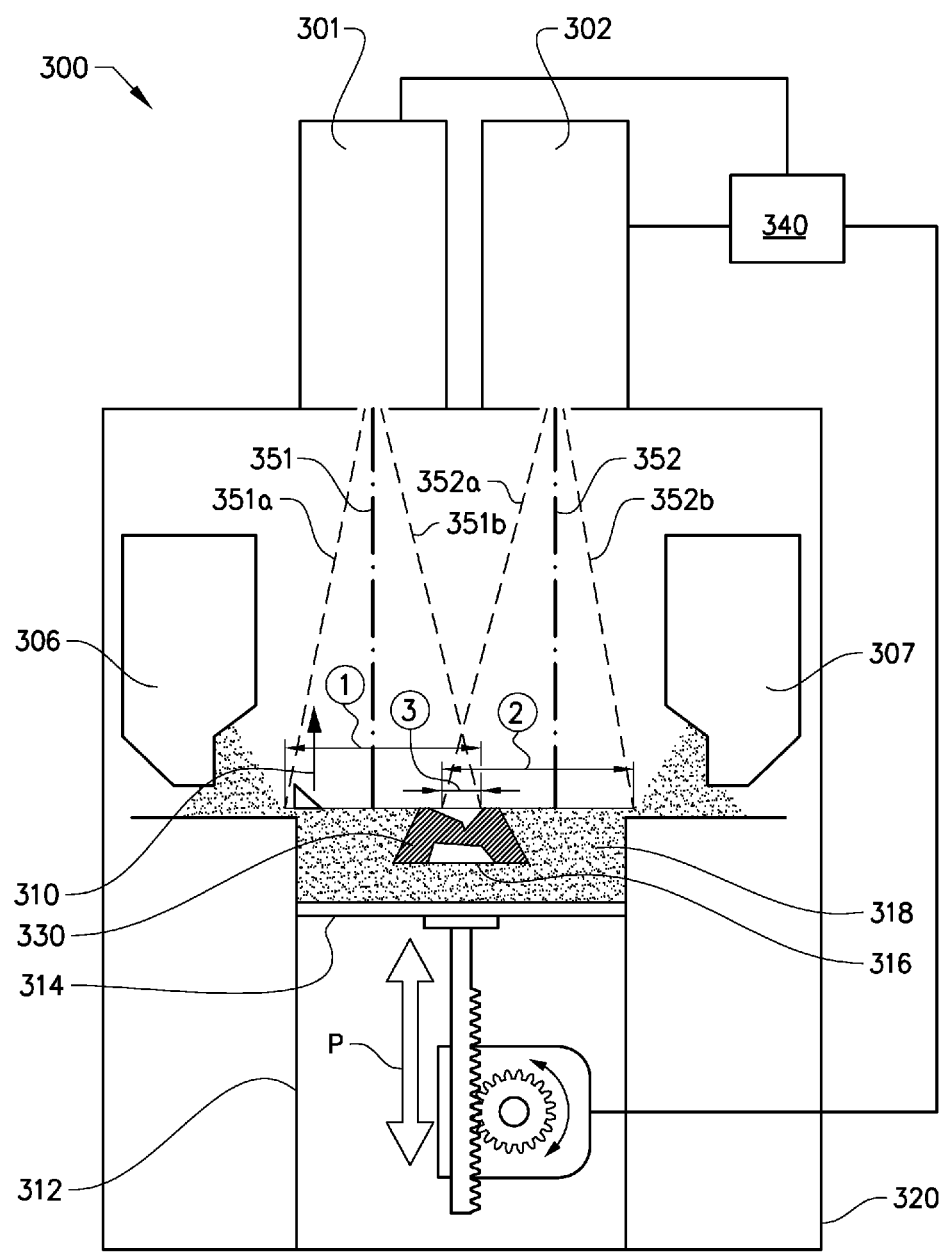
FIG. 3 depicts an apparatus according to an embodiment of the present invention.

FIG. 3 depicts an example embodiment of a freeform fabrication or additive manufacturing apparatus 300 according to the present invention. Said apparatus 300 comprises two electron guns 301, 302; two powder hoppers 306, 307; a start plate 316; a build tank 312; a powder distributor 310; a build platform 314; a vacuum chamber 320 and a control unit 340. FIG. 3 discloses only two beam sources for sake of simplicity. Of course, any number of beam sources can be used in a similar manner as the two beam sources which are used for describing the invention. It is obvious for the skilled person when having seen the inventive concept as disclosed herein using only two beam sources and apply them for any specific number that might suit his or her purpose.

The vacuum chamber 320 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by the control unit 340. In another embodiment the build tank may be provided in an enclosable chamber provided with ambient air and atmosphere pressure. In still another example embodiment said build chamber may be provided in open air.

The electron guns 301, 302 are generating electron beams, which are used for melting or fusing together powder material 318 provided on the start plate 316. At least a portion of the electron guns 301, 302 may be provided in the vacuum chamber 320. The control unit 340 may be used for controlling and managing the electron beams emitted from the electron beam guns 301, 302. A first electron beam source 301 may be emitting a first electron beam 351 and a second electron beam source 302 may be emitting a second electron beam 352. The first electron beam 351 may be deflected between at least a first extreme position 351a and at least a second extreme position 351b defining a first selected area 1. The second electron beam 352 may be deflected between at least a first extreme position 352a and at least a second extreme position 352b defining a second selected area 2. At least one of said first or second extreme positions 351a, 351b of said first electron beam 351 may be overlapping one of said at least first or second extreme positions 352a, 352b of said second electron beam 352 and thereby creating an overlap region 3.

At least one focusing coil (not shown), at least one deflection coil and an electron beam power supply may be electrically connected to said control unit. In an example embodiment of the invention said first end second electron beam source may generate a focusable electron beam with an accelerating voltage of about 60 kV and with a beam power in the range of 0-3 kW. The pressure in the vacuum chamber may be in the range of $10^{-3}$-$10^{-6}$ mBar when building the three-dimensional article by fusing the powder layer by layer with the energy beam sources 301, 302.

Instead of melting the powder material with two electron beams, two or more laser beams may be used. Each laser beam may normally be deflected by one or more movable mirror provided in the laser beam path between the laser beam source and the work table onto which the powder material is arranged which is to be fused by said laser beam. The control unit 340 may manage the deflection of the mirrors so as to steer the laser beam to a predetermined position on the work table.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, and the like. Instead of two powder hoppers, one powder hopper may be used. Other designs and/or mechanism for of the powder supply may be used, for instance a powder tank with a height-adjustable floor.

The powder distributor 310 is arranged to lay down a thin layer of the powder material on the start plate 316. During a work cycle the build platform 314 will be lowered successively in relation to the ray gun after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on said start plate 316. A first layer of powder material may be thicker than the other applied layers. The reason for starting with a first layer which is thicker than the other layers is that one does not want a melt-through of the first layer onto the start plate. The build platform is thereafter lowered in connection with laying down a new powder material layer for the formation of a new cross section of a three-dimensional article. Means for lowering the build platform 314 may for instance be through a servo engine equipped with a gear, adjusting screws, and the like.

Figure 5:
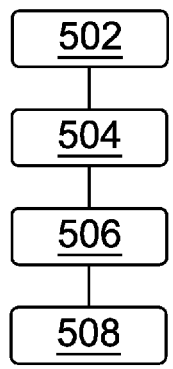
FIG. 5 depicts a flow chart of the method according to an embodiment of the present invention.
Figure 6A:
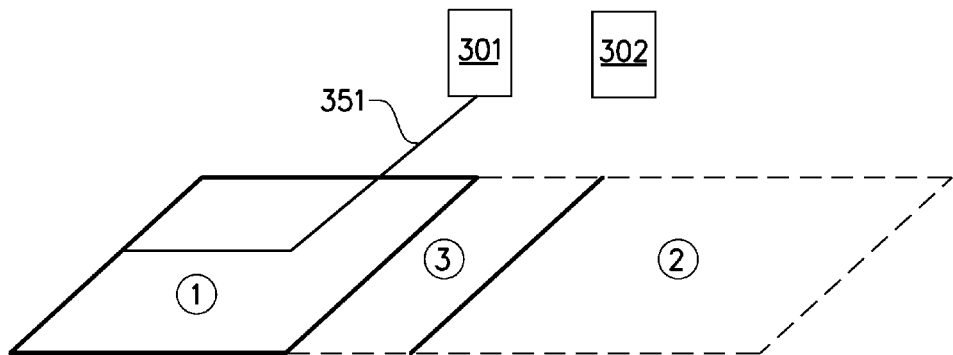
FIGS. 6A-C depict a perspective view image of an example embodiment of the present invention with two beam sources and two selected locations which are partially overlapping each other.
Figure 6B:
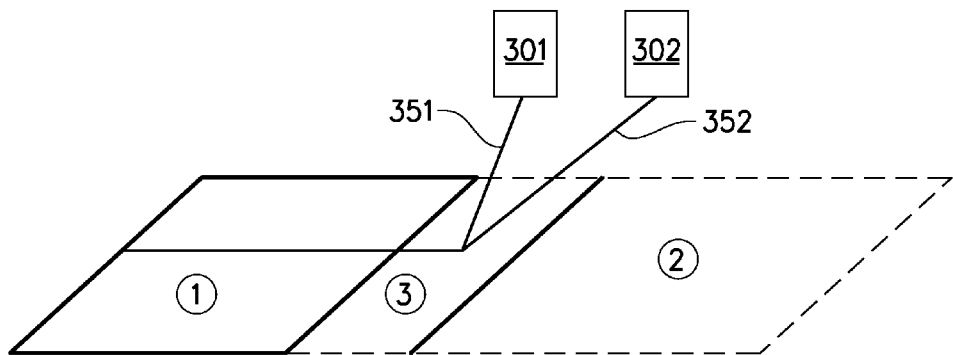
Figure 6C:
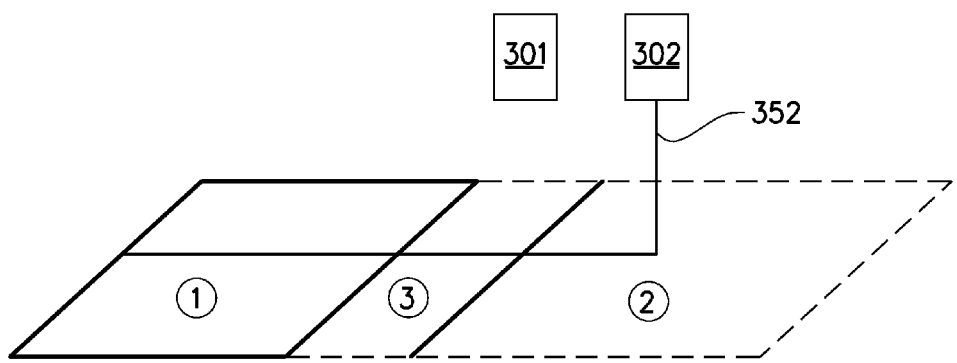

In FIG. 5 it is depicted a flow chart of an example embodiment of a method according to the present invention for forming a three-dimensional article through successive fusion of parts of a powder bed, which parts corresponds to successive cross sections of the three-dimensional article, comprising a first step 502 of providing a model of said three dimensional article. Said model may be a computer model generated via a CAD (Computer Aided Design) tool.

In a second step 504 a first powder layer is provided on the start plate 316. The powder may be distributed evenly over the worktable according to several methods. One way to distribute the powder is to collect material fallen down from the hopper 306, 307 by a rake system. The rake is moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 314. Instead of starting to build the three-dimensional article on said start plate said three-dimensional article may be built on said build platform 314 which may be removable. In yet another exemplary embodiment, said three-dimensional article may be started to be built on a powder bed.

In a third step 506 a first energy beam is directed from a first energy beam source over said start plate 316 or build platform 314 causing said first powder layer to fuse in said first selected locations 1 according to said model to form a first cross section of said three-dimensional article 330. A first energy beam 351 may reach a predetermined area which is dependent on the maximum deflection angle and the distance from the energy beam source 301 to the work table. For this reason the first energy beam 351 may only reach a portion of the total build area, i.e., a portion of a first cross section of the three-dimensional article 330.

The first energy beam 351 may be an electron beam or a laser beam. The beam is directed over said start plate 316 from instructions given by a control unit 340. In the control unit 340 instructions for how to control the beam source 301, 302 for each layer of the three-dimensional article may be stored.

In a fourth step 508 a second energy beam 352 is directed from a second energy beam source 302 over said start plate 316 causing said first powder layer to fuse in second selected locations 2 according to said model to form the first cross section of said three-dimensional article 330.

As with the first energy beam 351, the second energy beam 352 may also reach a predetermined area which is dependent on the maximum deflection angle and the distance from the energy beam source to the start plate 316 or the powder layer to be fused. For this reason the second energy beam 352 may only reach a portion of the total build area, i.e., a portion of a first cross section of the three-dimensional article 330.

Said first and second selected locations 1, 2 of said first powder layer are at least partially overlapping each other in the overlap region 3. The first selected locations 1 of said first powder layer is fused with the first energy beam 351, and the second selected locations 2 of said first power layer is fused with said second energy beam 352. In order to make sure that the fusion is completed over a full first cross section of said three-dimensional article, the first selected locations 1 and second selected locations 2 are at least partially overlapping each other. This means that the same area (overlap region) of the first cross section of the three dimensional article may be fused twice, once with the first energy beam and once with the second energy beam. In another embodiment said overlap region may be fused simultaneously with said first and second energy beam 351, 352.

Figure 1A:
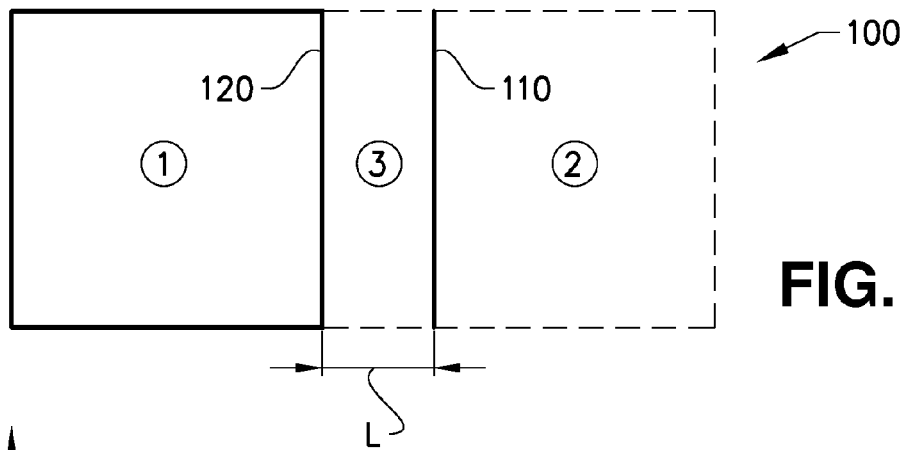
FIG. 1A depicts a top view image of a first fused powder layer.

FIG. 1A illustrates a work table or a start plate or a powder bed 100. A first energy beam may reach a first selected locations denoted by 1. A second energy beam may reach a second selected locations denoted by 2. Said first and second selected locations may be overlapping each other defining an overlapping zone denoted by 3. A length of the overlapping zone is denoted by L. The first selected locations 1 may be ending at a first line 110 and the second selected locations may be ending at a second line 120. The second line 120 is provided inside the first selected locations 1 which can be fused by the first energy beam 351, and the first line 110 is provided inside the second selected locations 2 which can be fused by the second energy beam 352.

In an example embodiment of the present invention said first and second locations 1, 2 of said first powder layer which are at least partially overlapping each other in the overlapping zone 3 may be simultaneously fused by said first and second energy beam 351, 352 from said first and second energy beam source 201, 302 respectively.

Simultaneous fusing by said first and second beam 351, 352 in said overlapping zone 3 may be performed in different ways.

A first way is to fuse or heat the powder with the first beam 351 at a first passage in said overlapping zone 3 simultaneously as the second beam 352 may be fusing or heating the powder at a second passage, which is separated from said first passage. A first passage fused by said first beam may be refused by the second beam after said first beam has left said passage, i.e., the first and second beams are not simultaneously at the very same position at any time.

Figure 1B:
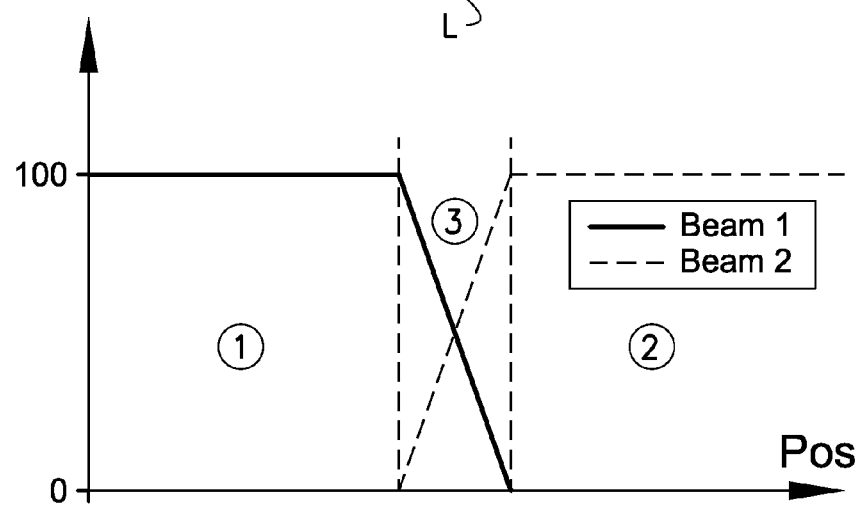
FIG. 1B depicts a first example embodiment of power vs. position diagram for the first and second beams.

A second way is to fuse or heat the powder with the first and the second beam so that said first and second beams 351, 352 are at least once in the very same position simultaneously. FIG. 1B illustrates one possible way of controlling the first and second beams 351, 352 when they are about to fuse the very same position of the overlapping zone 3. The sum of power of the first and second beam 351, 352 in a region where they are overlapping each other may be kept to a constant value. This means that there is neither extra power added to the fusion process nor any lack of power in the fusion process when there are two beams which are fusing the powder simultaneously instead of one beam.

The power of a single beam in the non-overlap region and the power of the two beams in the overlap region may be equal. Controlling the power of the beam at any position may be important for the control of the microstructure of the finalized three-dimensional article. In the example embodiment in Figure 1B the power is illustrated to be constant throughout the first and second area. Of course this is just a simplification of the real case. In the real case the power of the beam may alter from one position to the other in order to make sure that the build temperature and the fusion process is proceeding according to a predetermined schedule. In such a case it may be important to know that the sum of the first and second beam will sum up to the desired value which may be determined prior the fusion process in a simulation.

FIG. 1B and FIGS. 6A-C illustrate an example embodiment where two beam sources 301, 302 are used for fusing a predetermined area. A first selected location 1 is fused with the first beam 351. When said first beam reaches the overlapping zone 3 the second beam 352 is starting to fuse said overlapping zone 3 simultaneously and at the same position as said first beam 351 in said overlapping zone 3. As the first beam 351 continues to deflect into the overlapping zone 3, its power is decreased while the power of the second beam 352 is increased. The sum of the first and second beam 351, 352 may be kept constant in the overlapping zone 3. A second selected location 2 is fused with the second beam 352 only. The first beam was stopped at first line 110.

Figure 1C:
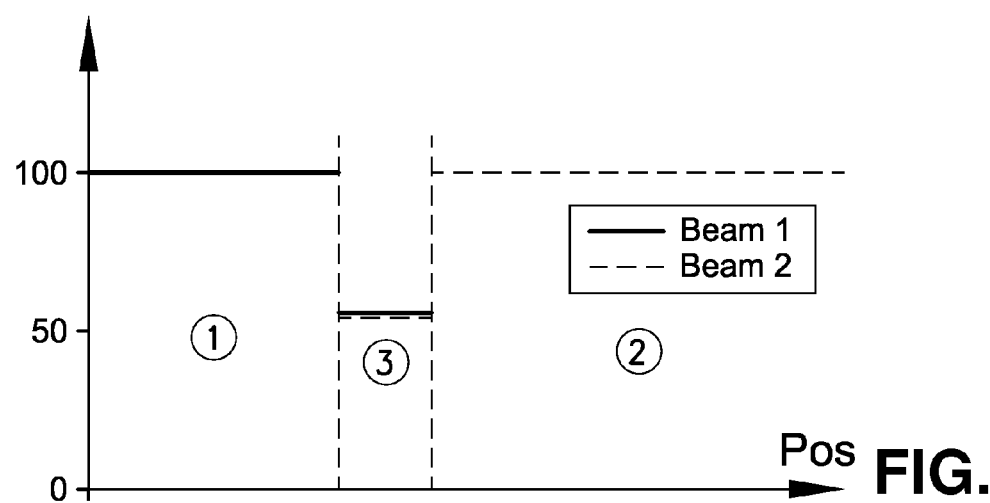
FIG. 1C depicts a second example embodiment of power vs. position diagram for the first and second beams.

In still another example embodiment according to the present invention is depicted in FIG. 1C. In FIG. 1C it is depicted that the first and second beam 351, 352 are each having the half of the required power, i.e., 50% of required power for the first beam 351 and 50% of the required power for the second beam 352. Alternatively, these figures can be divided unequally, e.g., the first beam may have 30% of the required power and the second beam may have 70% of the required power.

In an electron beam gun the quality of the beam is depending on the deflection angle. At no or low deflection angles the desired beam spot size is more or less the actual beam spot size. As the deflection angle is increased the spot size tends to increase and/or the spot shape tends to deviate from a circular one. As one of the beams is having a deflection angle which is larger than a predetermined value the beam power may be switched from one beam to two beams. By using two beams, each with a lower power than would be required if just one beam would be used in order to arrive at the desired beam power, the beam spot size and shape may be kept controllable although the deflection angle is relatively high. The reason for this is that a beam with a lower beam power is having a smaller spot size compared to a beam with a higher beam power. By using two beams with low power instead of one with high power the shape and size of the combined beams in a position where at least one of the beam is having a relatively high deflection angle may not be bigger than a predetermined value or deviate from a circular shape more than a predetermined value. In the overlapping zone there may be a first beam from a first beam source with a high deflection angle and a second beam from a second beam source with a smaller deflection angle than the first beam.

By using more than one energy beam source the build temperature of the three-dimensional build may more easily be maintained compared to if just one beam source is used. The reason for this is that two beam may be at more locations simultaneously than just one beam. Increasing the number of beam sources will further ease the control of the build temperature. By using a plurality of energy beam sources a first energy beam source may be used for melting the powder material and a second energy beam source may be used for heating the powder material in order to keep the build temperature within a predetermined temperature range.

After a first layer is finished, i.e., the fusion of powder material for making a first layer of the three-dimensional article, a second powder layer is provided on said work table 316. The second powder layer may be in certain embodiments distributed according to the same manner as the previous layer. However, there might be other methods in the same additive manufacturing machine for distributing powder onto the work table. For instance, a first layer may be provided by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the work table 316, the first energy beam 351 from the first energy beam source 301 may be directed over said work table 316 causing said second powder layer to fuse in a third selected locations according to said model to form a second cross section of said three-dimensional article.

Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

Figure 7:
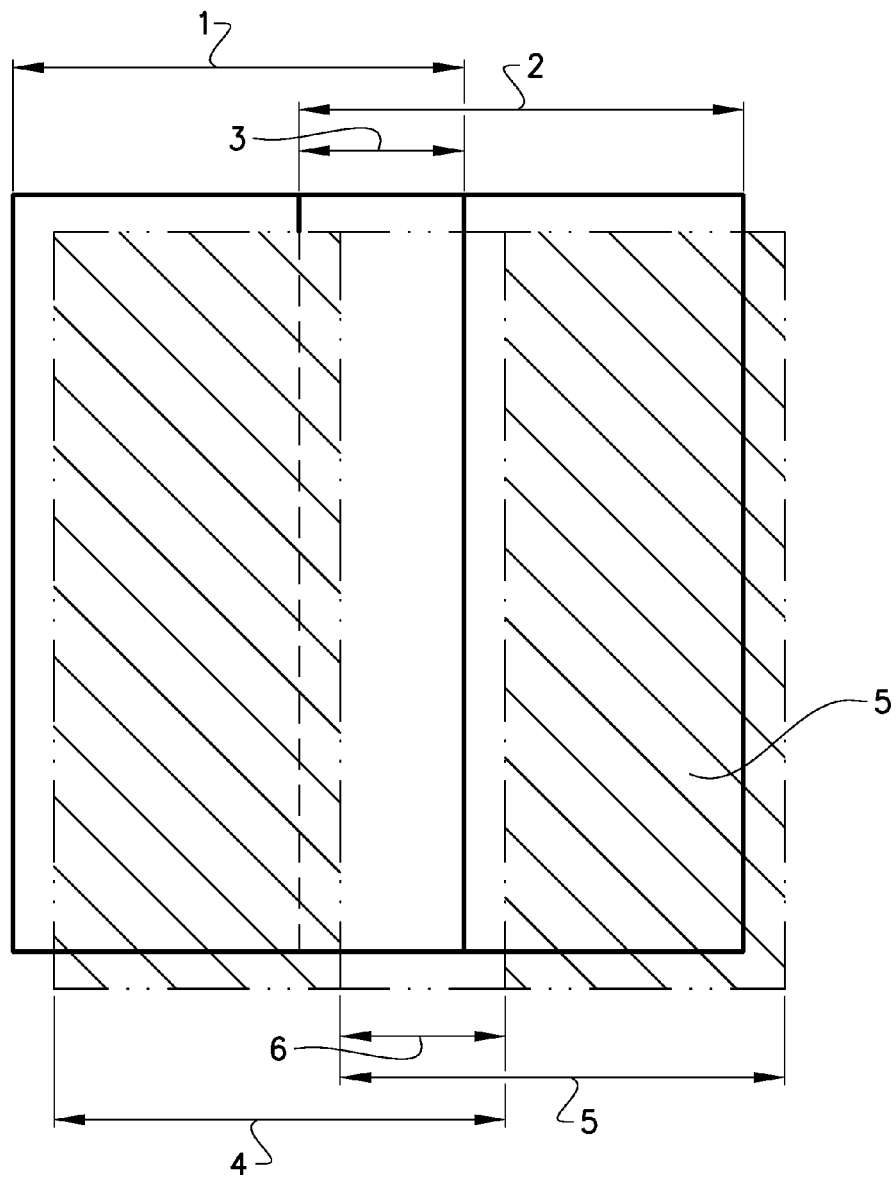
FIG. 7 depicts schematically a top view of two adjacent layers overlap zones and its relative position to each other.

The second energy beam 352 from the second energy beam source 302 may be directed over said work table 316 causing said second powder layer to fuse in a fourth selected locations according to said model to form the second cross section of said three-dimensional article, said third and fourth selected locations of said second powder layer may be at least partially overlapping each other, where the at least partially overlapping third and fourth locations 4, 5 may be laterally shifted with respect to the at least partially overlapping first and second locations 1, 2, see FIG. 7. In FIG. 7 it is depicted that an overlapping zone 6 in the second layer is shifted laterally with respect to the overlapping zone 3 in the first layer. The shift may be as large as the overlapping zones 3, 6 are not overlapping each other. The shift may be within a predetermined range so that the overlap zones are still overlapping each other. The length L of the overlapping zone may vary from one layer to another.

The energy beam, which may be a laser beam or an electron beam, not only melts the last applied powder layer but also at least the layer of material below the powder layer resulting in a melt comprising the powder material and already melted material from a previous fusion process.

In still another example embodiment according to the present invention a width 190, 192 of the overlapping zone may be equal in the first and second layer. In other embodiments, the length 190, 192 of the overlapping zone may be different in the first layer compared to the second layer. In still another example embodiment said length of the overlapping zone is randomized between a predetermined minimum value and maximum value for at least one layer.

In still another example embodiment of the present invention a laterally shifted distance of said third and fourth at least partially overlapping locations may be chosen to a value resulting in a non-overlap of the third and fourth at least partially overlapping locations and the at least partially overlapping first and second locations. This means that for a first layer the overlap region is arranged at a first position. In the second layer the overlap region is arranged in a second position which is not overlapping the first position in the first layer. This may improve the build quality of the three dimensional article since the overlap is not provided on top of each other for two adjacent layers.

Figure 2:
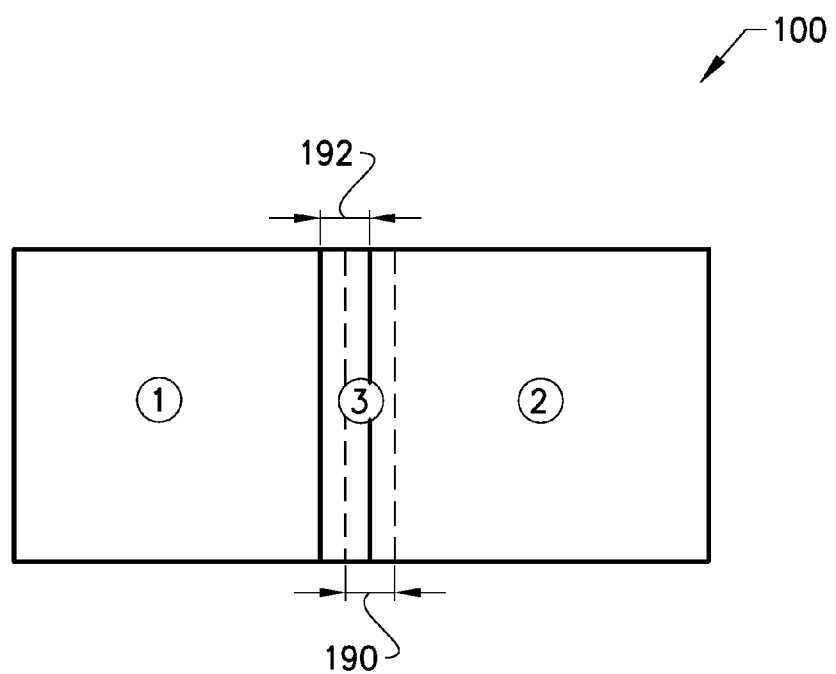
FIG. 2 depicts a top view of a second example embodiment according to the present invention of a first and second fused powder layer.

In still another example embodiment the laterally shifted distance of said third and fourth at least partially overlapping locations may be chosen to a value resulting in an overlap of the third and fourth at least partially overlapping locations and the at least partially overlapping first and second locations, see FIG. 2 where the overlap of two adjacent layers are overlapping each other but the second layer is shifted with respect to the first layer.

The laterally shifted distance of said third and fourth at least partially overlapping locations may be randomized within a predetermined range.

Figure 4:
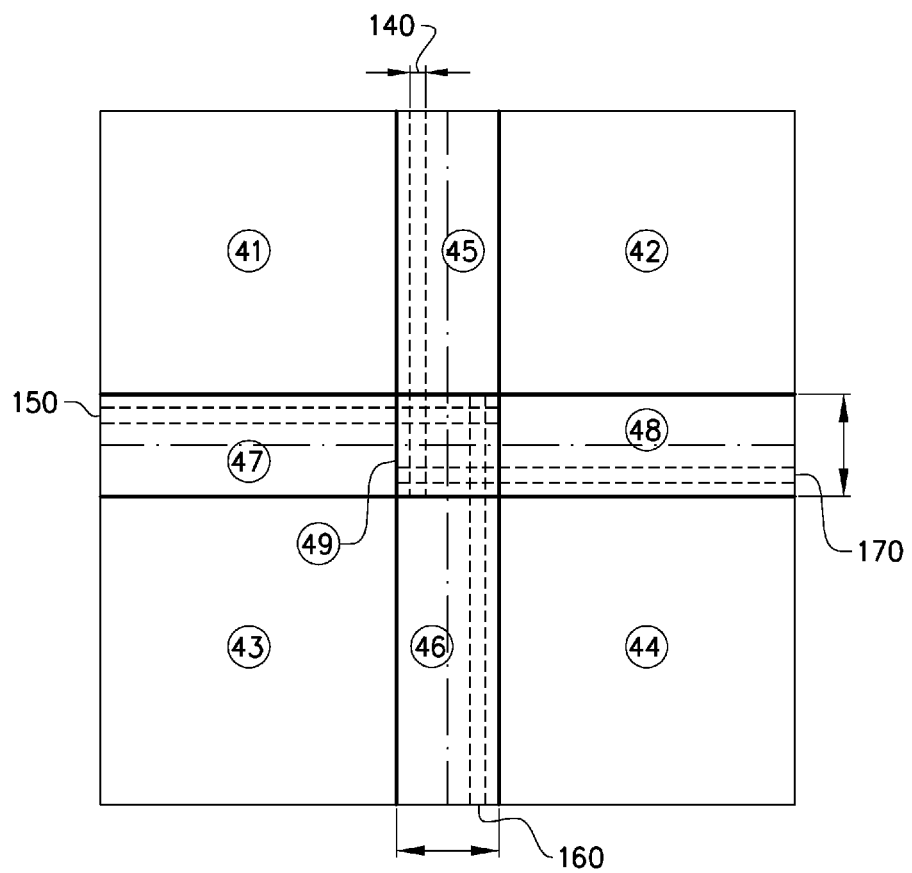
FIG. 4 depicts a top view image of example another embodiment according to the present invention of overlapping regions.

FIG. 4 depicts a top view image of example another embodiment according to the present invention of overlapping regions. In FIG. 4 different energy beam sources are used, each of them capable of fusing a predetermined area of the powder layer. A first energy beam from a first energy beam source may fuse a first area denoted 41. A second energy beam from a second energy beam source may fuse a second area denoted 42. A third energy beam from a third energy beam source may fuse a third area denoted 43. A fourth energy beam from a fourth energy beam source may fuse a fourth area denoted 44.

The first area 41 and the second area 42 may overlap each other in a first overlap area denoted 45. The first area 41 and the third area 43 may overlap each other in a third overlap area denoted 47. The third area 43 and the fourth area 44 may overlap each other in a second overlap area denoted 46. The fourth area 44 and the second area 42 may overlap each other in a forth overlap area denoted 48. The first, second, third and fourth area are all overlapping each other in a fifth overlap area denoted by 49. For instance the first overlap area 45 defines the limits of the first and second beams, i.e., the leftmost solid line of the first overlap area 45 defines the leftmost position of the second energy beam and the rightmost solid line of the first overlap area defines the rightmost position of the first energy beam. Within the first overlap area the actual overlapping zone may be defined and positioned. The same applies mutatis mutandis to the second, third, fourth and fifth overlapping areas 46, 47, 48 and 49.

In a first layer an overlapping zone 140 of the first area 41 and the second area 42 may be arranged at a first position within said overlap area 45. In a second layer an overlapping zone 140 of the first area 41 and the second area 42 may be arranged at a second position within said overlap area 45. The first and second position may be partially overlapping each other, fully overlapping each other or non-overlapping. The first and second position of said overlapping zone may be randomized for each layer and each overlap area. The length of the overlapping zone 140, 150, 160, 170 may by different for different overlap regions within the same layer and may be different for the same overlap region for different layers.

In an still another example embodiment of a device for forming a three-dimensional article through successive fusion of parts of a powder bed, which parts corresponds to successive cross sections of the three-dimensional article. Said device comprising a first energy beam source adapted to fuse a first powder layer in first selected locations according to a model in order to form a first cross section of said three-dimensional article. Said device further comprising a second energy beam source adapted to fuse a first powder layer in second selected locations according to said model in order to form a first cross section of said three-dimensional article. Said device further comprising a control unit adapted to control said first and second energy beam sources so that said first and second locations of said first powder layer are at least partially overlapping each other.

It should be understood that the present invention is not limited to the above-described embodiments and many modifications are possible within the scope of the following claims. Such modifications may, for example, involve using a different source of energy beam than the exemplified electron beam such as a laser beam. Additionally or otherwise, materials other than metallic powder may be used, such as the non-limiting examples of powder of polymers or powder of ceramics.

That which is claimed:

1. A method for forming a three-dimensional article through successive fusion of parts of a powder bed, which parts correspond to successive cross sections of the three-dimensional article, said method comprising the steps of:
   providing a model of said three dimensional article;
   applying a first powder layer on a work table;
   directing a first energy beam from a first energy beam source over said work table, said directing of said first energy beam causing said first powder layer to fuse in first selected locations according to said model, so as to form a first part of the first cross section of said three-dimensional article;
   directing a second energy beam from a second energy beam source over said work table, said directing of said second energy beam causing said first powder layer to fuse in second selected locations according to said model, so as to form a second part of the first cross section of said three-dimensional article, wherein said first and second locations of said first powder layer are at least partially overlapping each other in a first overlapping zone;
   fusing said first and second locations of said first powder layer simultaneously via said first and second energy beam from said first and second energy beam source, respectively;
   overlapping a spot of said first energy beam at least partially with a spot of said second energy beam during at least one occasion of said fusing of said first overlapping zone; and
   maintaining the sum of power of the first and second beam in said first overlapping zone at a predetermined value, wherein the individual power of each of the first and the second beams in said first overlapping zone is half that of each of the first and the second beams outside said first overlapping zone or said predetermined value is equal to the individual power of at least one of the first or the second beam outside said first overlapping zone.

2. A method for forming a three-dimensional article through successive fusion of parts of a powder bed, which parts correspond to successive cross sections of the three-dimensional article, said method comprising the steps of:
   providing a model of said three dimensional article;
   applying a first powder layer on a work table;
   directing a first energy beam from a first energy beam source over said work table, said directing of said first energy beam causing said first powder layer to fuse in first selected locations according to said model, so as to form a first part of the first cross section of said three-dimensional article;
   directing a second energy beam from a second energy beam source over said work table, said directing of said second energy beam causing said first powder layer to fuse in second selected locations according to said model, so as to form a second part of the first cross section of said three-dimensional article, wherein said first and second locations of said first powder layer are at least partially overlapping each other in a first overlapping zone;
   fusing said first and second locations of said first powder layer simultaneously via said first and second energy beam from said first and second energy beam source, respectively;
   overlapping a spot of said first energy beam at least partially with a spot of said second energy beam during at least one occasion of said fusing of said first overlapping zone;
   varying the power of said first beam linearly from 100% to 0% starting at a first end of said overlapping zone and ending at a second end of said overlapping zone; and
   simultaneously varying the power of said second beam linearly from 0% to 100% starting at the first end of said first overlapping zone and ending at the second end of said overlapping zone.

3. The method according to claim 2, wherein a sum of said variable power of said first and said second beams between said first and said second ends of said overlapping zone is maintained at a predetermined value.

4. The method according to claim 3, wherein said predetermined value is a constant value.

5. The method according to claim 3, wherein said predetermined value is equal to the individual power of at least one of the first or the second beam outside said first overlapping zone.

* * * * *